(12) United States Patent
Okutani et al.

(10) Patent No.: US 7,054,814 B2
(45) Date of Patent: May 30, 2006

(54) METHOD AND APPARATUS OF SELECTING SEGMENTS FOR SPEECH SYNTHESIS BY WAY OF SPEECH SEGMENT RECOGNITION

(75) Inventors: Yasuo Okutani, Kanagawa (JP); Yasuhiro Komori, Kanagawa (JP); Toshiaki Fukada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 443 days.

(21) Appl. No.: 09/819,613

(22) Filed: Mar. 29, 2001

(65) Prior Publication Data
US 2002/0051955 A1    May 2, 2002

(30) Foreign Application Priority Data
Mar. 31, 2000    (JP)    ............................. 2000-099532

(51) Int. Cl.
*G10L 15/14* (2006.01)
(52) U.S. Cl. .................................. 704/256.4; 704/254
(58) Field of Classification Search ................ 704/256, 704/10, 231, 260, 268, 258, 9, 254, 256.2, 704/256.4, 256.5; 358/1.9; 712/11
See application file for complete search history.

(56) References Cited

U.S. PATENT DOCUMENTS

| | | | | |
|---|---|---|---|---|
| 5,311,429 A * | 5/1994 | Tominaga | .................... | 704/10 |
| 5,633,984 A | 5/1997 | Aso et al. | .................... | 395/2.69 |
| 5,678,054 A * | 10/1997 | Shibata | .................... | 715/532 |
| 5,745,650 A | 4/1998 | Otsuka et al. | .................... | 395/2.69 |
| 5,745,651 A | 4/1998 | Otsuka et al. | .................... | 395/2.77 |
| 5,787,396 A * | 7/1998 | Komori et al. | .................... | 704/256 |
| 5,797,116 A | 8/1998 | Yamada et al. | .................... | 704/10 |
| 5,812,975 A * | 9/1998 | Komori et al. | .................... | 704/256 |
| 5,845,047 A * | 12/1998 | Fukada et al. | .................... | 704/268 |
| 5,905,972 A * | 5/1999 | Huang et al. | .................... | 704/258 |
| 5,913,193 A * | 6/1999 | Huang et al. | .................... | 704/256 |
| 5,926,784 A * | 7/1999 | Richardson et al. | .................... | 704/10 |
| 5,956,679 A * | 9/1999 | Komori et al. | .................... | 704/256 |
| 5,970,445 A | 10/1999 | Yamamoto et al. | .................... | 704/230 |
| 6,000,024 A * | 12/1999 | Maddox | .................... | 712/11 |
| 6,021,388 A | 2/2000 | Otsuka et al. | .................... | 704/268 |
| 6,076,061 A | 6/2000 | Kawasaki et al. | .................... | 704/270 |
| 6,108,628 A | 8/2000 | Komori et al. | .................... | 704/256 |
| 6,236,962 B1 | 5/2001 | Kosaka et al. | .................... | 704/234 |
| 6,266,636 B1 * | 7/2001 | Kosaka et al. | .................... | 704/256 |
| 6,333,794 B1 * | 12/2001 | Imai et al. | .................... | 358/1.9 |
| 6,374,210 B1 * | 4/2002 | Chu | .................... | 704/9 |
| 6,385,339 B1 * | 5/2002 | Yokota et al. | .................... | 704/10 |
| 6,546,367 B1 * | 4/2003 | Otsuka | .................... | 704/260 |

(Continued)

OTHER PUBLICATIONS

Rosenberg ("Connected Sentence Recognition Using Diphone-Like Templates" International Conference on Acoustics, Speech and Signal Processing, Apr. 1988).*

(Continued)

*Primary Examiner*—Angela Armstrong
(74) *Attorney, Agent, or Firm*—Fitzpatrick, Cella, Harper & Scinto (57) ABSTRACT

A speech segment search unit searches a speech database for speech segments that satisfy a phonetic environment, and a HMM learning unit computes the HMMs of phonemes on the basis of the search result. A segment recognition unit performs segment recognition of speech segments on the basis of the computed HMMs of the phonemes, and when the phoneme of the segment recognition result is equal to a phoneme of the source speech segment, that speech segment is registered in a segment dictionary.

10 Claims, 7 Drawing Sheets

U.S. PATENT DOCUMENTS

2001/0043344 A1*  11/2001  Imai et al. .................... 358/1.9
2002/0095282 A1*   7/2002  Goronzy et al. .............. 704/10
2002/0107688 A1*   8/2002  Otsuka ....................... 704/231

OTHER PUBLICATIONS

Nakagawa et al ("A Method For Continuous Speech Segmentation Using HMM", 9th International Conference on Pattern Recognition, Nov. 1988) statistical segmentation using a hidden Markov model (HMM) of vowels & consonants.*

U.S. Appl. No. 09/037,998.*
U.S. Appl. No. 09/263,262.*
U.S. Appl. No. 09/264,866.*
U.S. Appl. No. 09/262,852.*

* cited by examiner

| RECOGNITION TARGET | ALLOWABLE PATTERN |
|---|---|
| a.y | a.i |
| a.k | a.p, a.t |
| ... | |
| i.n | ... |
| ... | |

FIG. 7

METHOD AND APPARATUS OF SELECTING SEGMENTS FOR SPEECH SYNTHESIS BY WAY OF SPEECH SEGMENT RECOGNITION

FIELD OF THE INVENTION

The present invention relates to a speech signal processing apparatus and method for forming a segment dictionary used in speech synthesis, and a storage medium.

BACKGROUND OF THE INVENTION

In recent years, a speech synthesis method in which speech segments in units of phonemes, diphones, or the like are registered in a segment dictionary, the segment dictionary is searched in accordance with input phonetic text upon producing synthetic speech, and synthetic speech corresponding to the phonetic text is produced by modifying and concatenating found speech segments to output speech has become the mainstream.

In such speech synthesis method, the quality of each speech segment itself registered in the segment dictionary is important. Therefore, if phonetic environments of speech segments are not constant or the speech segments include noise, synthetic speech produced using such speech segments includes allophone or noise even when speech synthesis is done with higher precision.

SUMMARY OF THE INVENTION

The present invention has been made in consideration of the aforementioned prior art, and has as its object to provide a speech signal processing apparatus and method, which make segment recognition using HMM and register a speech segment in a dictionary in accordance with the recognition result, and a storage medium.

It is another object of the present invention to provide a speech signal processing apparatus and method, which form a segment dictionary that can prevent sound quality in synthetic speech from deteriorating, and a storage medium.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

Preferred embodiments of the present invention will be described in detail hereinafter with reference to the accompanying drawings.

[First Embodiment]

Figure 1:
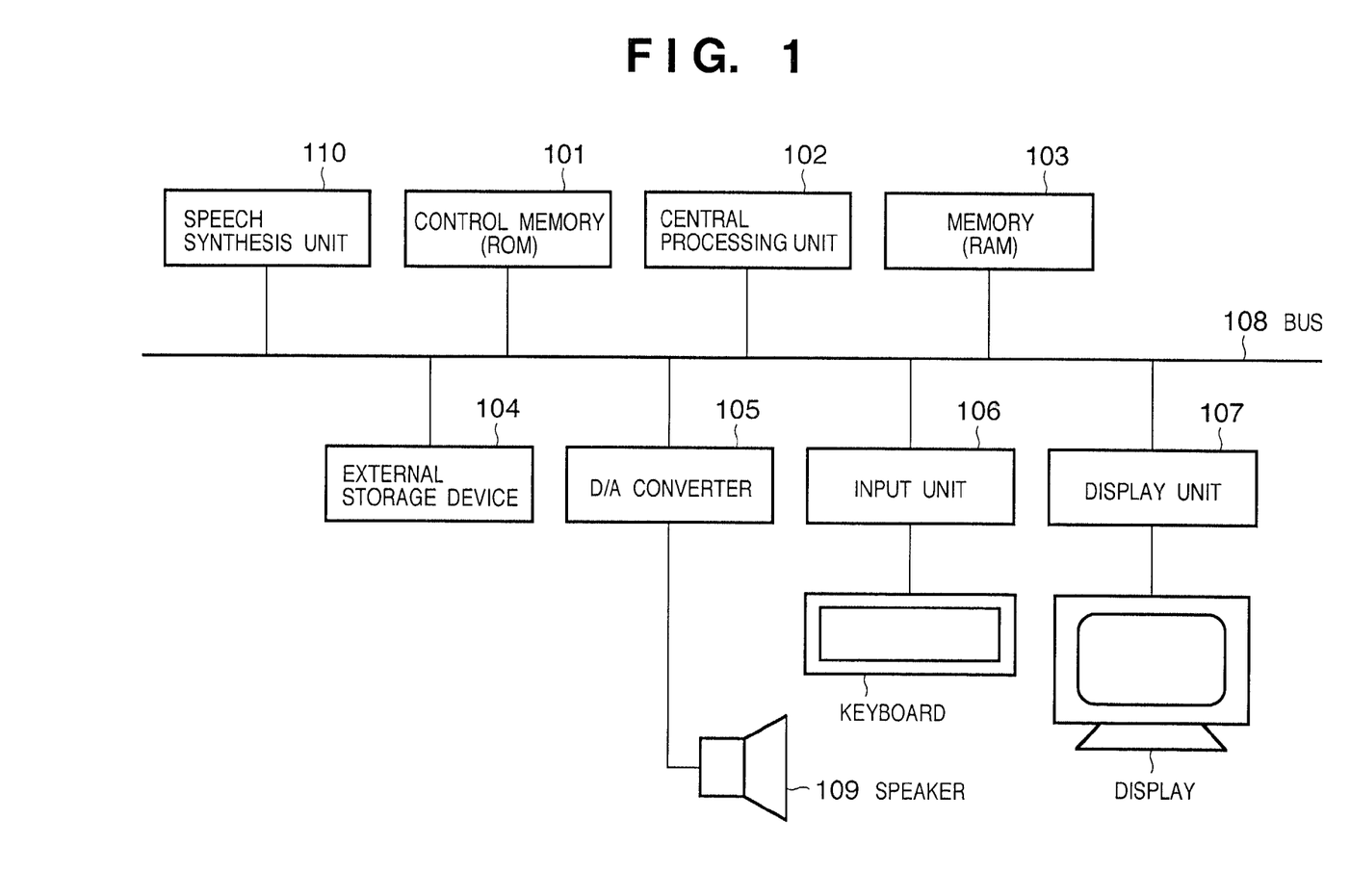
FIG. 1 is a block diagram showing the hardware arrangement of a speech synthesis apparatus according to an embodiment of the present invention.

FIG. 1 is a block diagram showing the hardware arrangement of a speech synthesis apparatus according to an embodiment of the present invention. Note that this embodiment will exemplify a case wherein a general personal computer is used as a speech synthesis apparatus, but the present invention can be practiced using a dedicated speech synthesis apparatus or other apparatuses.

Referring to FIG. 1, reference numeral 101 denotes a control memory (ROM) which stores various control data used by a central processing unit (CPU) 102. The CPU 102 controls the operation of the overall apparatus by executing a control program stored in a RAM 103. Reference numeral 103 denotes a memory (RAM) which is used as a work area upon execution of various control processes by the CPU 102 to temporarily save various data, and loads and stores a control program from an external storage device 104 upon executing various processes by the CPU 102. This external storage device includes, e.g., a hard disk, CD-ROM, or the like. Reference numeral 105 denotes a D/A converter for converting input digital data that represents a speech signal into an analog signal by outputting the analog signal to a loudspeaker 109. Reference numeral 106 denotes an input unit which comprises, e.g., a keyboard and a pointing device such as a mouse or the like, which are operated by the operator. Reference numeral 107 denotes a display unit which comprises a CRT display, liquid crystal display, or the like. Reference numeral 108 denotes a bus which connects those units. Reference numeral 110 denotes a speech synthesis unit.

In the above arrangement, a control program for controlling the speech synthesis unit 110 of this embodiment is loaded from the external storage device 104, and is stored on the RAM 103. Various data used by this control program are stored in the control memory 101. Those data are fetched onto the memory 103 as needed via the bus 108 under the control of the CPU 102, and are used in the control processes of the CPU 102. The D/A converter 105 converts speech waveform data produced by executing the control program into an analog signal, and outputs the analog signal to the loudspeaker 109.

Figure 2:
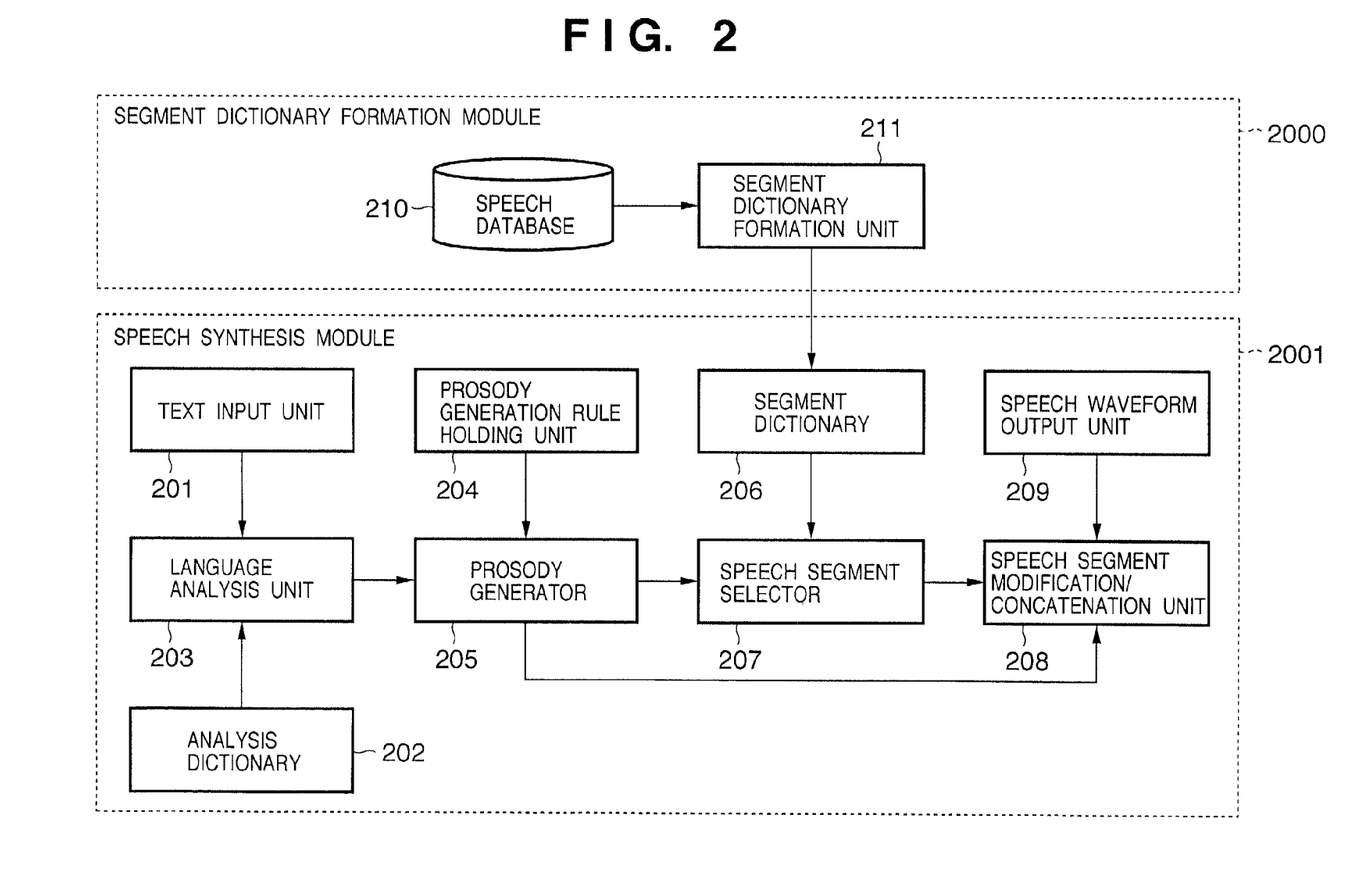
FIG. 2 is a block diagram showing the module arrangement of a speech synthesis apparatus according to the first embodiment of the present invention.

FIG. 2 is a block diagram showing the module arrangement of the speech synthesis unit 110 according to this embodiment. The speech synthesis unit 110 roughly has two modules, i.e., a segment dictionary formation module 2000 for executing a process for registering speech segments in a segment dictionary 206, and a speech synthesis module 2001 for receiving text data, and executing a process for synthesizing and outputting speech corresponding to that text data.

Referring to FIG. 2, reference numeral 201 denotes a text input unit for receiving arbitrary text data from the input unit 106 or external storage device 104; 202, an analysis dictionary; 203, a language analyzer; 204, a prosody generation rule holding unit; 205, a prosody generator; 206, a segment dictionary; 207, a speech segment selector; 208, a speech segment modification/concatenation unit for modifying speech segments using PSOLA (Pitch Synchronous Overlap and Add); 209, a speech waveform output unit; 210, a speech database; and 211, a segment dictionary formation unit.

The process in the speech synthesis module 2001 will be explained first. In the speech synthesis module 2001, the language analyzer 203 executes language analysis of text input from the text input unit 201 by looking up the analysis dictionary 202. The analysis result is input to the prosody generator 205. The prosody generator 205 generates a phoneme and prosody information on the basis of the analysis result of the language analyzer 203 and information that pertains to prosody generation rules held in the prosody generation rule holding unit 204, and outputs them to the speech segment selector 207 and speech segment modification/concatenation unit 208. Subsequently, the speech segment selector 207 selects corresponding speech segments from those held in the segment dictionary 206 using the prosody generation result input from the prosody generator 205. The speech segment modification/concatenation unit 208 modifies and concatenates speech segments output from the speech segment selector 207 in accordance with the prosody generation result input from the prosody generator 205 to generate a speech waveform. The generated speech waveform is output by the speech waveform output unit 209.

The segment dictionary formation module 2000 will be explained below.

In the process of this module, the segment dictionary formation unit 211 selects speech segments from the speech database 210 and registers them in the segment dictionary 206 on the basis of a procedure to be described later.

A speech synthesis process of this embodiment with the above arrangement will be described below.

Figure 3:
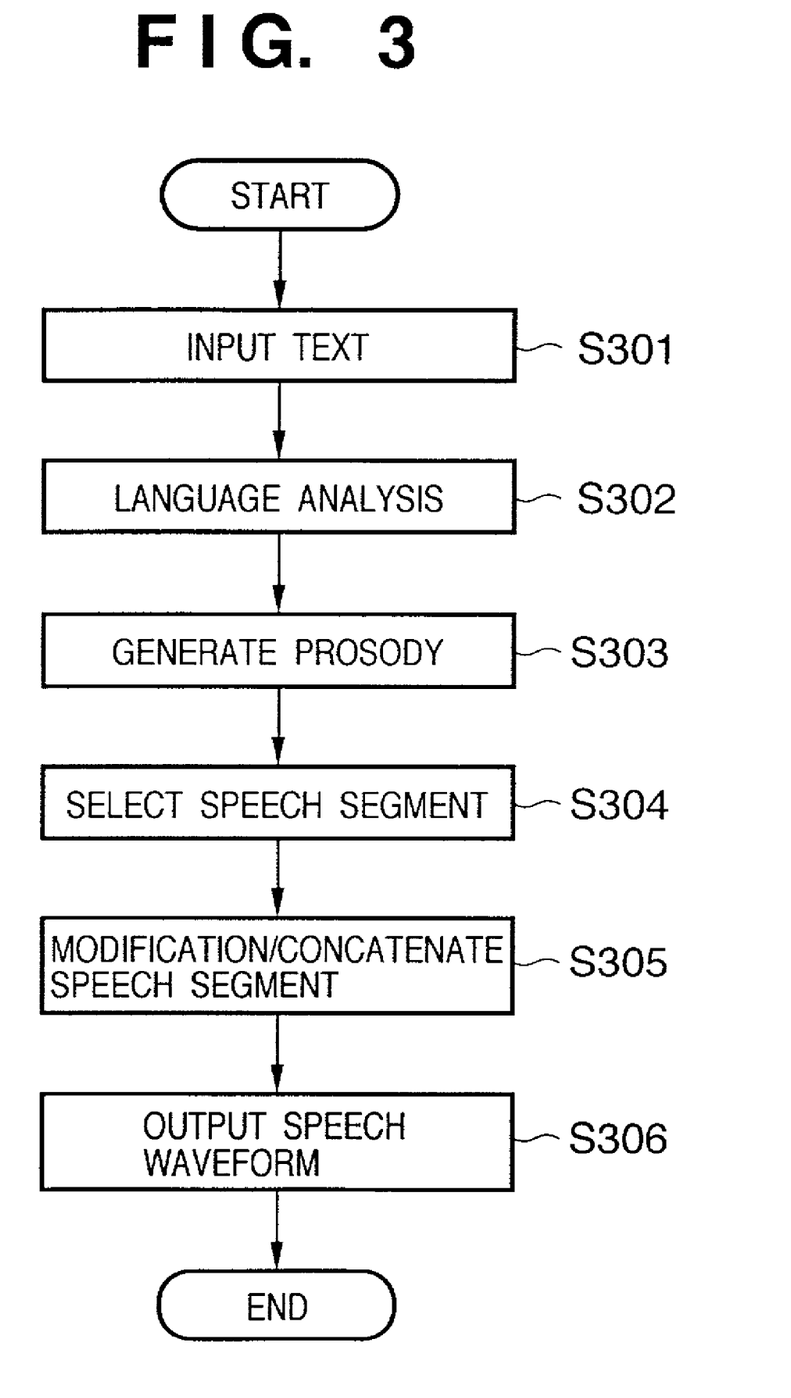
FIG. 3 is a flow chart showing the flow of processing in an on-line module according to the first embodiment.

FIG. 3 is a flow chart showing the flow of a speech synthesis process (on-line process) in the speech synthesis module 2001 shown in FIG. 2.

In step S301, the text input unit 201 inputs text data in units of sentences, clauses, words, or the like, and the flow advances to step S302. In step S302, the language analyzer 203 executes language analysis of the text data. The flow advances to step S303, and the prosody generator 205 generates a phoneme and prosody information on the basis of the analysis result obtained in step S302, and predetermined prosodic rules. The flow advances to step S304, and the speech segment selector 207 selects for each phoneme speech segments registered in the segment dictionary 206 on the basis of the prosody information obtained in step S303 and a predetermined phonetic environment. The flow advances to step S305, and the speech segment modification/concatenation unit 208 modifies and concatenates speech segments on the basis of the selected speech segments and the prosody information generated in step S303. The flow then advances to step S306. In step S306, the speech waveform output unit 209 outputs a speech waveform produced by the speech segment modification/concatenation unit 208 as a speech signal. In this way, synthetic speech corresponding to the input text is output.

Figure 4:
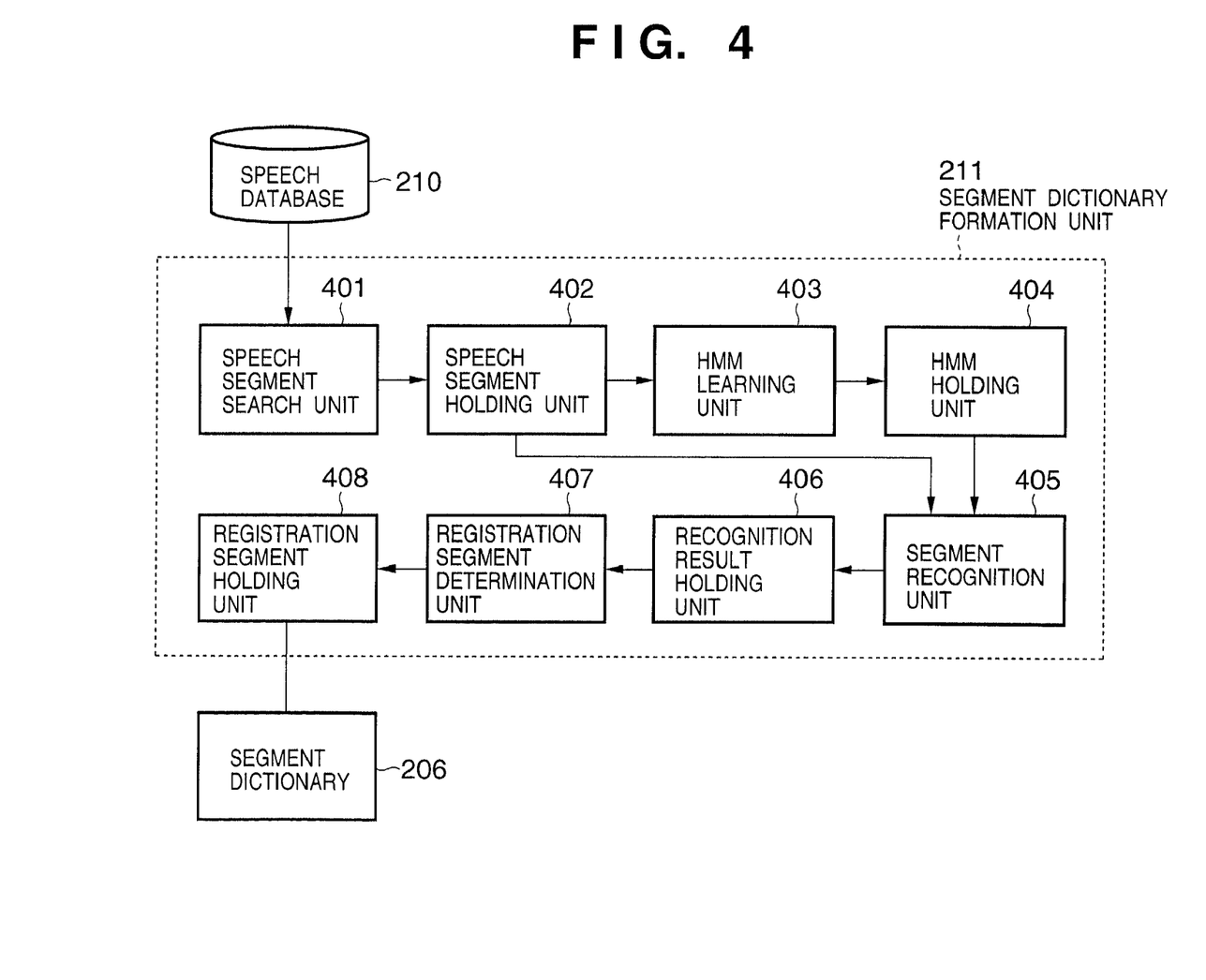
FIG. 4 is a block diagram showing the detailed arrangement of an off-line module according to the first embodiment.

FIG. 4 is a block diagram showing the more detailed arrangement of the segment dictionary formation module 2000 in FIG. 2. The same reference numerals in FIG. 4 denote the same parts as in FIG. 2, and FIG. 4 shows the arrangement of the segment dictionary formation unit 211 as a characteristic feature of this embodiment in more detail.

Referring to FIG. 4, reference numeral 401 denotes a speech segment search unit; 402, a speech segment holding unit; 403, a HMM learning unit; 404, a HMM holding unit; 405, a segment recognition unit; 406, a recognition result holding unit; 407, a registration segment determination unit; and 408, a registration segment holding unit. Note that reference numeral 210 denotes the speech database shown in FIG. 2.

The speech segment search unit 401 searches the speech database 210 for speech segments that satisfy a predetermined phonetic environment. In this case, a plurality of speech segments are found. The speech segment holding unit 402 holds these found speech segments. The HMM learning unit 403 computes the cepstra of the speech segments held in the speech segment holding unit 402 by computing, e.g., the Fourier transforms of waveforms of these speech segments, and computes and outputs the HMMs of phonemes on the basis of the computation results. The HMM holding unit 404 holds learning results (HMMs) in units of phonemes. The segment recognition unit 405 makes segment recognition of all speech segments used in learning of HMMs using the learned HMMs to obtain a HMM with a maximum likelihood (maximum likelihood HMM). It is then checked if the speech segment of interest is the same phoneme to the maximum likelihood HMM. The recognition result holding unit 406 holds that segment recognition result. The registration segment determination unit 407 adopts only a speech segment for which segment recognition was successful from the recognition result in the segment recognition unit 405 as a segment to be registered. The registration segment holding 408 holds only a speech segment to be registered in the segment dictionary 406, which is determined by the registration segment determination unit 407.

Figure 5:
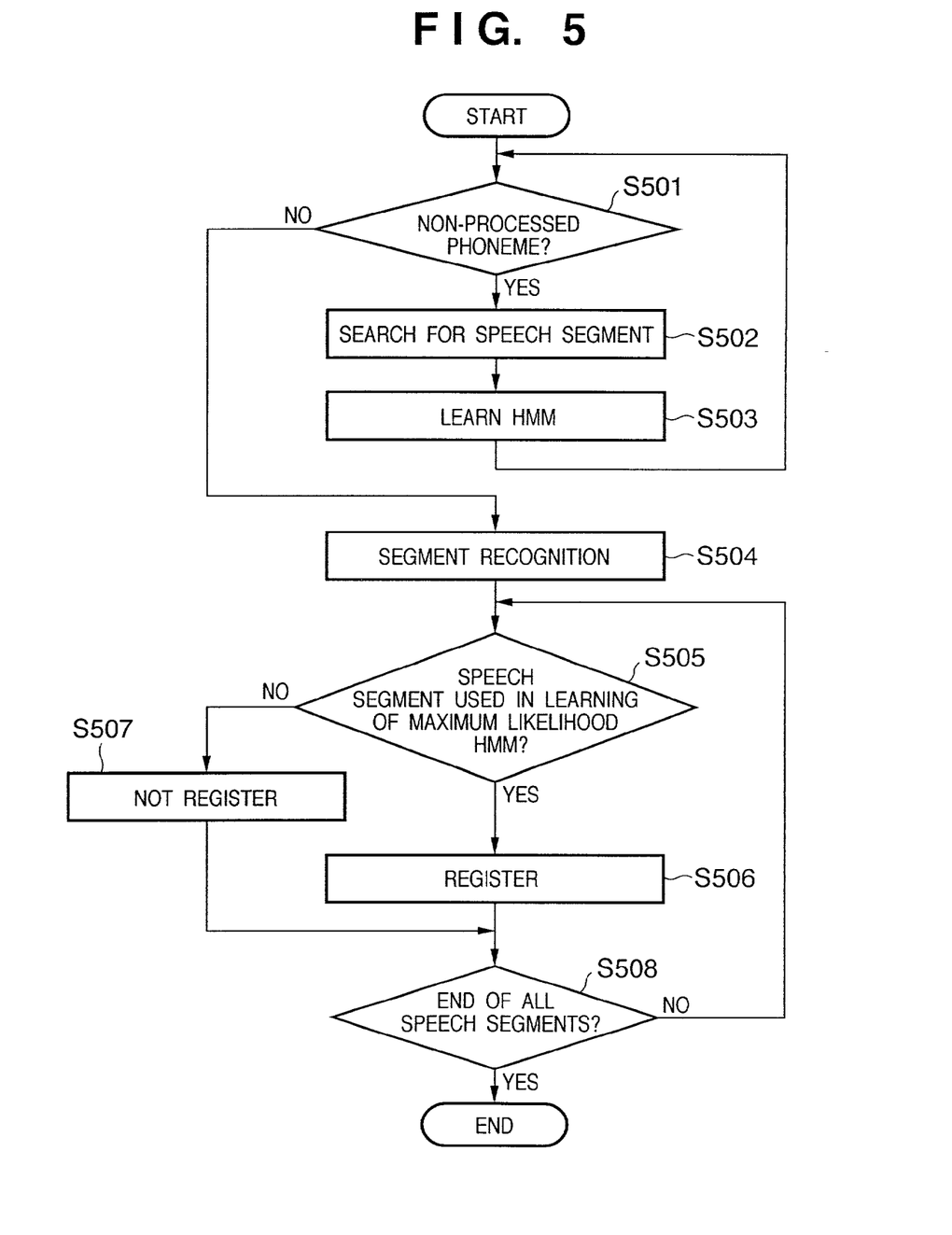
FIG. 5 is a flow chart showing the flow of processing in the off-line module according to the first embodiment.

FIG. 5 is a flow chart showing the operation of the segment dictionary formation module 2000 according to this embodiment.

It is checked in step S501 if all phonemes defined by diphones as phonetic units have been processed. If phonemes to be processed remain, the flow advances to step S502; otherwise, the flow jumps to a segment recognition process in step S504.

In step S502, the speech segment search unit 401 searches the speech database 210 for speech segments that satisfy a predetermined phonetic environment, and holds a plurality of speech segments found by search in the speech segment holding unit 402. The flow then advances to step S503. In step S503, the HMM learning unit 405 learns a HMM of a given phoneme using the found speech segments as learning data. More specifically, a total of 34-dimensional vectors (16 orders of cepstra, 16 orders of delta cepstra, power, and delta power) are computed from a sampling rate of 22050 Hz of a speech waveform every frame duration of 2.5 msec using a window duration of 25.6 msec. Note that power and delta power values are normalized to the range from "0" to "1" in units of sentences in the speech database. A HMM initial model of a 5-state 1-mixture distribution is formed, and a HMM is learned using the cepstrum vectors under the aforementioned conditions. After the HMM of a given phoneme obtained as a result of learning is held in the HMM holding unit 404, the flow returns to step S501 to obtain a HMM of the next phoneme.

In step S504, the segment recognition unit 405 performs segment recognition of all the speech segments found in step S502 using the HMMs of the phoneme strings. That is, a likelihood between a speech segment and the HMM of each phoneme is computed in units of speech segments. The flow then advances to step S505 to obtain a HMM with the maximum likelihood with a given speech segment in units of speech segments, and it is checked if that speech segment is used in learning of that HMM. If the speech segment is used in learning of that HMM, it is determined that segment recognition was successful, and the flow advances to step S506 to register that speech segment in the segment dictionary 506.

On the other hand, if it is determined in step S505 that the speech segment is not the one used in learning of the HMM, it is determined in step S507 that the speech segment is not registered in step S206, and the flow advances to step S508 without registering the speech segment in the segment dictionary 206. After the process in step S506 or S507 is executed, the flow advances to step S508 to check if a discrimination process for all the speech segments used in learning of HMMs of all the phonemes in step S504 is complete. If NO in step S508, the flow returns to step S505 to repeat the aforementioned process.

As described above, according to the first embodiment, HMMs corresponding to respective phonemes are learned using a plurality of speech segments that satisfy a predetermined phonetic environment, all the speech segments used in learning of HMMs undergo segment recognition using the learned HMMs, and only a speech segment which is determined to be used in learning of the maximum likelihood HMM is registered in the segment dictionary.

With this arrangement, a segment dictionary from which speech segments including allophone and noise are excluded can be formed, and a segment dictionary which can suppress deterioration of sound quality of synthetic speech can be provided. When synthetic speech is produced using the segment dictionary 206 formed according to the aforementioned procedure, deterioration of sound quality of synthetic speech can be suppressed.

[Second Embodiment]

In the first embodiment, the HMM learning unit 402 generates HMMs in units of phonemes, and the segment recognition unit 405 computes the likelihoods for all the speech segments used in learning of the HMMs. However, the present invention is not limited to this. For example, when diphones are used as phonemes, phonemes may be categorized into four categories: CC, CV, VC, and VV, and speech segments that belong to the same category may undergo segment recognition. Note that C represents a consonant, and V a vowel.

[Third Embodiment]

In the first and second embodiments, a speech segment which is not successfully recognized is not registered. However, the present invention is not limited to this. For example, a table that describes allowable recognition error patterns in advance is prepared, and if a speech segment which is not successfully recognized matches an allowable pattern prepared in that table, the registration segment determination unit 407 determines that the speech segment can be registered in the segment dictionary 206.

Figure 6:
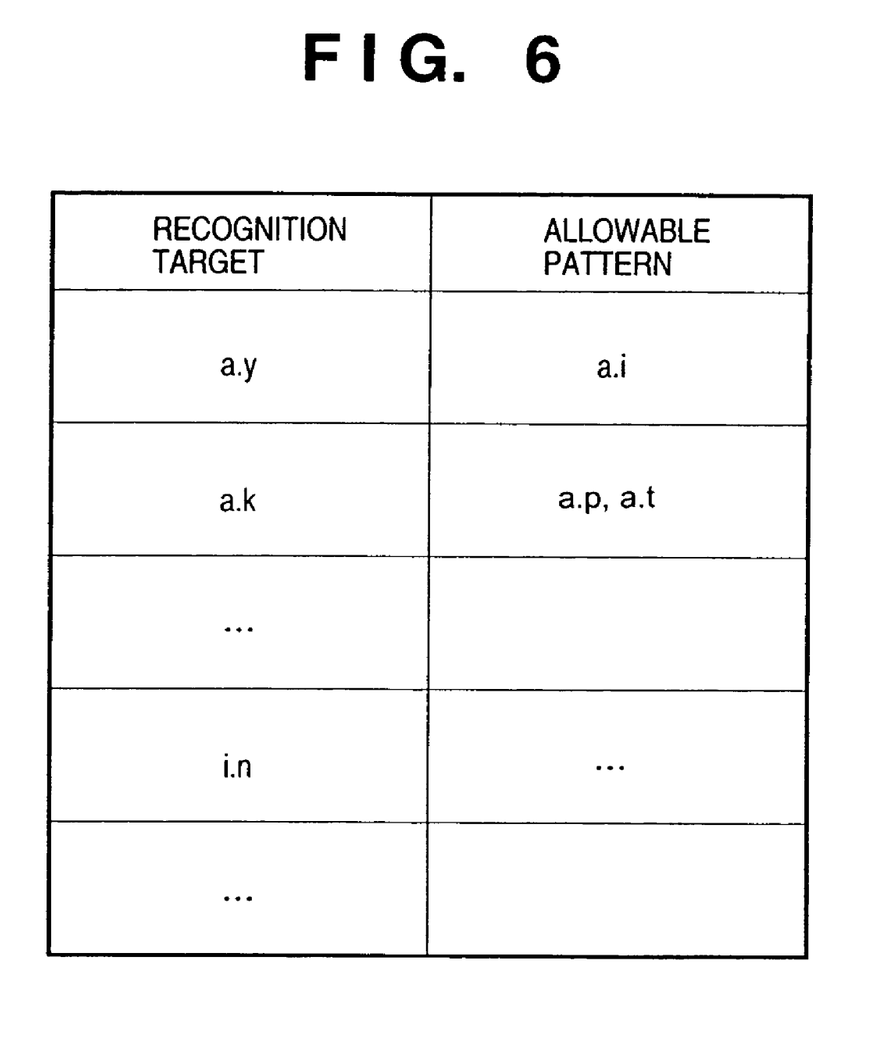
FIG. 6 shows the format of a table that stores error recognition allowable patterns according to the third embodiment of the present invention.

FIG. 6 shows an example of an allowable table according to the third embodiment.

FIG. 6 shows an example that adopts diphones as phonemes. In this case, even when a speech segment which is used in learning of an HMM of a diphone "a.y" is recognized as "a.i", or even when a speech segment which is used in learning of an HMM of a diphone "a.k" is recognized as "a.p" or "a.t", such speech segment is registered in the segment dictionary as an allowable one.

Figure 7:
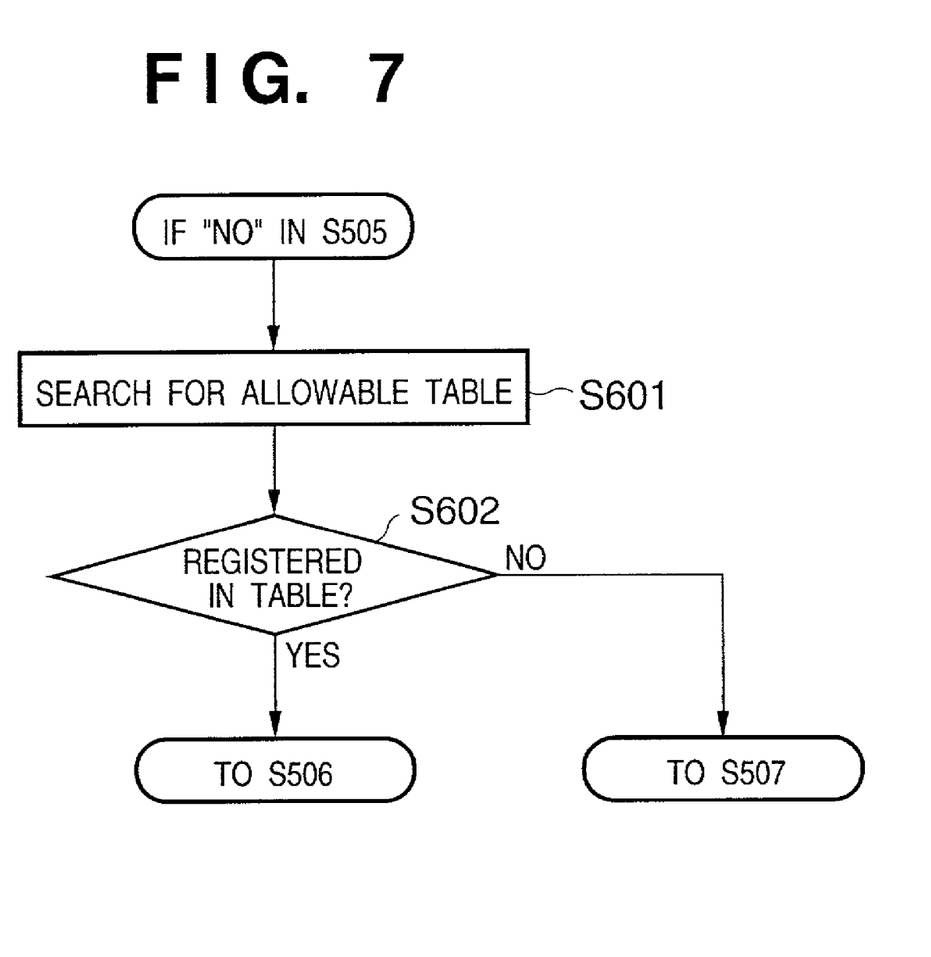
FIG. 7 is a flow chart showing the flow of processing in an off-line module according to the third embodiment of the present invention.

FIG. 7 is a flow chart showing the processing in such case. This processing is executed when it is determined in step S505 in FIG. 5 that the speech segment of interest is not used in learning of the corresponding HMIM. The flow advances to step S601 to search the allowable table (provided to the registration segment determination unit 407). At step S602, it is checked if the diphone of the recognition result is found in that table. If it is found at step S602, the flow advances to step S506 in FIG. 5 to register that speech segment in the segment dictionary 206; otherwise, the flow advances to step S507 not to register that segment in the segment dictionary 206.

[Fourth Embodiment]

In the second embodiment above, when diphones are used as phonemes, a speech segment which is not successfully recognized is not registered. However, the present invention is not limited to this, and when a phoneme in which the number of segments that are successfully recognized is equal to or smaller than a threshold value belongs to, e.g., a category VC, that phoneme may be allowed if the V part matches.

[Fifth Embodiment]

In the first embodiment, the likelihoods of each speech segment with the HMMs of all phonemes obtained in step S503 are computed. However, the present invention is not limited to this. For example, likelihoods between an HMM of a given phoneme and speech segments used in learning of that HMM are computed, and N (N is an integer) best speech segments in descending order of likelihood may be registered, or only a speech segment having a likelihood equal to or higher than a predetermined threshold value may be registered.

[Sixth Embodiment]

In the first to fifth embodiments, the likelihoods computed in step S504 are compared without being normalized. However, the present invention is not limited to this. Each likelihood may be normalized by the duration of the corresponding speech segment, and a speech segment to be registered may be selected using the normalized likelihood in the above procedure.

In the above embodiments, the respective units are constructed on a single computer. However, the present invention is not limited to such specific arrangement, and the respective units may be divisionally constructed on computers or processing apparatuses distributed on a network.

In the above embodiments, the program is held in the control memory (ROM). However, the present invention is not limited to such specific arrangement, and the program may be implemented using an arbitrary storage medium such as an external storage or the like. Alternatively, the program may be implemented by a circuit that can attain the same operation.

Note that the present invention may be applied to either a system constituted by a plurality of devices, or an apparatus consisting of a single equipment. The present invention is also achieved by supplying a recording medium, which records a program code of software that can implement the functions of the above-mentioned embodiments to the system or apparatus, and reading out and executing the program code stored in the recording medium by a computer (or a CPU or MPU) of the system or apparatus.

In this case, the program code itself read out from the recording medium implements the functions of the above-mentioned embodiments, and the recording medium which records the program code constitutes the present invention.

As the recording medium for supplying the program code, for example, a floppy disk, hard disk, optical disk, magneto-optical disk, CD-ROM, CD-R, magnetic tape, nonvolatile memory card, ROM, and the like may be used. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

As described above, according to the above embodiments, a speech synthesis apparatus and method, which can exclude speech segments that include allophone or noise, and can produce synthetic speech which suffers less deterioration of sound quality, since speech segments to be registered in the segment dictionary are selected by exploiting the segment recognition results obtained using HMMs, can be provided.

The present invention is not limited to the above embodiments and various changes and modifications can be made within the spirit and scope of the present invention. Therefore, to apprise the public of the scope of the present invention, the following claims are made.

What is claimed is:

1. An apparatus for forming a speech segment dictionary for use in speech synthesis, comprising:
    speech segment search means for searching a speech database for speech segments that satisfy a phonetic environment;
    HMM learning means for computing HIMMs of phonemes on the basis of a search result of said speech segment search means;
    segment recognition means for performing segment recognition of the speech segments on the basis of the HMMs of the phonemes; and
    registration segment means for determining and registering a speech segment in a segment dictionary when the number of speech segments recognized by said segment recognition means is not less than a predetermined value.

2. The apparatus according to claim 1, wherein said registration segment means registers a speech segment in the segment dictionary if at least a vowel part of the speech segment is correctly recognized, even when the number of speech segments recognized by said segment recognition means is not more than a predetermined value.

3. A method for forming a speech segment dictionary for use in speech synthesis, comprising:
    a speech segment search step of searching a speech database for speech segments that satisfy a phonetic environment;
    an HMM learning step of computing HMMs of phonemes on the basis of a search result in said speech segment search step;
    a segment recognition step of performing segment recognition of the speech segments on the basis of the HMMs of the phonemes; and
    a registration segment step of determining and registering a speech segment in a segment dictionary when the number of speech segments recognized in said segment recognition step is not less than a predetermined value.

4. The method according to claim 3, wherein said registration segment step includes a step of registering a speech segment in the segment dictionary if at least a vowel part of the speech segment is correctly recognized, even when the number of speech segments recognized in said segment recognition step is not more than a predetermined value.

5. A speech synthesis apparatus comprising a unit for synthesizing speech and a unit for forming a speech segment dictionary for use in speech synthesis, the unit for forming a speech segment dictionary for use in speech synthesis comprising:
    speech segment search means for searching a speech database for speech segments that satisfy a phonetic environment;
    HMM learning means for computing HMMs of phonemes on the basis of a search result of said speech segment search means;
    segment recognition means for performing segment recognition of the speech segments on the basis of the HMMs of the phonemes; and
    registration segment means for determining and registering a speech segment in a segment dictionary when the number of speech segments recognized by said segment recognition means is not less than a predetermined value.

6. The apparatus according to claim 5, wherein said registration segment means registers a speech segment in the segment dictionary if at least a vowel part of the speech segment is correctly recognized, even when the number of speech segments recognized by said segment recognition means is not more than a predetermined value.

7. A speech synthesis apparatus comprising (i) a unit for forming a speech segment dictionary for use in speech synthesis, and (ii) a unit for synthesizing speech, wherein said unit for forming a speech segment dictionary for use in speech synthesis comprises:
    speech segment search means for searching a speech database for speech segments that satisfy a phonetic environment;
    HMM learning means for computing HMMs of phonemes on the basis of a search result of said speech segment search means;
    segment recognition means for performing segment recognition of the speech segments on the basis of the HMMs of the phonemes; and
    registration segment means for determining and registering a speech segment in a segment dictionary when the number of speech segments recognized by said segment recognition means is not less than a predetermined value,
    and wherein said unit for synthesizing speech comprises:
    a unit for inputting text data; and
    a unit for synthesizing speech corresponding to the inputted text data, using the unit for forming a speech segment dictionary for use in speech synthesis.

8. The apparatus according to claim 7, wherein said registration segment means registers a speech segment in the segment dictionary if at least a vowel part of the speech segment is correctly recognized, even when the number of speech segments recognized by said segment recognition means is not more than a predetermined value.

9. A speech synthesis method comprising (i) a method for forming a speech segment dictionary for use in speech synthesis, and (ii) a method for synthesizing speech, wherein said method for forming a speech segment dictionary for use in speech synthesis comprises:

a speech segment search step of searching a speech database for speech segments that satisfy a phonetic environment;

an HMM learning step of computing HMMs of phonemes on the basis of a search result in said speech segment search step;

a segment recognition step of performing segment recognition of the speech segments on the basis of the HMMs of the phonemes; and a registration segment step of determining and registering a speech segment in a segment dictionary when the number of speech segments recognized in said segment recognition step is not less than a predetermined value, and wherein said method for synthesizing speech comprises:

an input step of inputting text data; and a speech synthesis step of synthesizing speech corresponding to the inputted text data, using the method for forming a speech segment dictionary for use in speech synthesis.

10. The speech signal processing method according to claim 9, wherein said registration segment step includes a step of registering a speech segment in the segment dictionary if at least a vowel part of the speech segment is correctly recognized, even when the number of speech segments recognized in said segment recognition step is not more than a predetermined value.

* * * * *

UNITED STATES PATENT AND TRADEMARK OFFICE
CERTIFICATE OF CORRECTION

PATENT NO. : 7,054,814 B2
APPLICATION NO. : 09/819613
DATED : May 30, 2006
INVENTOR(S) : Yasuo Okutani et al.

It is certified that error appears in the above-identified patent and that said Letters Patent is hereby corrected as shown below:

ON THE COVER PAGE
(Item 56), U.S. PATENT DOCUMENTS, insert --6,662,159    12/2003    Komori et al.--

(Item 56), OTHER PUBLICATIONS, "Nakagawa et al." should read --Nakazawa et al.--

COLUMN 4
Line 31, "408" should read --unit 408--.
Line 32, "406" should read --206--.

COLUMN 5
Line 8, "506." should read --206.--.
Line 12, "S206," should read --S506,--.

COLUMN 6
Line 4, "HMIM" should read --HMM--.

COLUMN 7
Line 36, "HIMMs" should read --HMMs--.

Signed and Sealed this

Thirtieth Day of January, 2007

JON W. DUDAS
*Director of the United States Patent and Trademark Office*